US010168988B2

(12) United States Patent
Hu et al.

(10) Patent No.: US 10,168,988 B2
(45) Date of Patent: Jan. 1, 2019

(54) IDENTIFYING USER PREFERENCES AND CHANGING SETTINGS OF A DEVICE BASED ON NATURAL LANGUAGE PROCESSING

(71) Applicant: International Business Machines Corporation, Armonk, NY (US)

(72) Inventors: Jing Jing Hu, Beijing (CN); Ling Ma, Beijing (CN); Graham A. Watts, Ottawa (CA); Xiao Jin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 15/163,024

(22) Filed: May 24, 2016

(65) Prior Publication Data

US 2017/0344338 A1    Nov. 30, 2017

(51) Int. Cl.
*G06F 3/16* (2006.01)
*G10L 15/22* (2006.01)

(52) U.S. Cl.
CPC ........ *G06F 3/167* (2013.01); *G10L 2015/227* (2013.01)

(58) Field of Classification Search
CPC .................................................... G06F 3/167
USPC ........................................................ 704/10
See application file for complete search history.

(56) References Cited

U.S. PATENT DOCUMENTS

| 4,688,195 | A | 8/1987 | Thompson et al. |
| 6,530,083 | B1 | 3/2003 | Liebenow |
| 6,926,199 | B2 | 8/2005 | Jay et al. |
| 8,099,313 | B2 * | 1/2012 | Messer ............. G06Q 10/10 705/7.21 |
| 8,554,217 | B2 | 10/2013 | Shin et al. |
| 9,419,928 | B2 * | 8/2016 | Miner .................. H04L 51/18 |
| 9,712,576 | B1 * | 7/2017 | Gill ..................... H04L 65/403 |
| 2006/0109102 | A1 | 5/2006 | Gortz et al. |
| 2009/0240647 | A1 | 9/2009 | Green et al. |
| 2014/0165002 | A1 | 6/2014 | Grove |

OTHER PUBLICATIONS

Paik et al., "Applying Natural Language Processing (NLP) Based Metadata Extraction to Automatically Acquire User Preferences", K-CAP'01, Oct. 22-23, 2001, Victoria, British Columbia, Canada, Copyright 2001 ACM, pp. 116-122.

* cited by examiner

*Primary Examiner* — Susan McFadden
(74) *Attorney, Agent, or Firm* — Edward P. Li

(57) ABSTRACT

A method, a computer program product, and a computer system for identifying user preferences and changing settings of a device based on natural language processing. One or more programs running in background on the device capture an input of natural language from a user of the device, match the input of the natural language to a user frustration, map the user frustration to one or more solutions that make one or more changes of settings on the device, apply the one or more changes of settings to set user preference settings on the device, and store the user preference settings in a common store for the user.

18 Claims, 3 Drawing Sheets

IDENTIFYING USER PREFERENCES AND CHANGING SETTINGS OF A DEVICE BASED ON NATURAL LANGUAGE PROCESSING

BACKGROUND

The present invention relates generally to natural language processing, and more particularly to identifying user preferences and changing settings of a device based on natural language processing.

Applications across devices, such as mobile phones, laptops, and tablets, bring more and more convenience for people's daily life. However, using and configuring these devices can be frustrating; for example, some people are always puzzled by how to make their devices to satisfy their tastes (the brightness, the volume, the font-size, and so on). Also, many users don't know some options for configuring the devices. Even for proficient users, quicker ways to configure the preferences of their devices are helpful. Most devices have settings that are available to the application running on the devices, such as a setting for the font size of the text. These settings are typically configured through menu driven setting applications on the devices.

SUMMARY

In one aspect, a method for identifying user preferences and changing settings of a device based on natural language processing is provided. The method is implemented by one or more programs running in background on the device. The method includes capturing an input of natural language from a user of the device. The method further includes matching the input of the natural language to a user frustration. The method further includes mapping the user frustration to one or more solutions that make one or more changes of settings on the device. The method further includes applying, the one or more changes of settings, so as to set user preference settings on the device. The method further includes storing the user preference settings in a common store for the user.

In another aspect, a computer program product for identifying user preferences and changing settings of a device based on natural language processing is provided. The computer program product comprises a computer readable storage medium having program code embodied therewith. The program code executable to: capture, by one or more programs running in background on the device, an input of natural language from a user of the device; match, by the one or more programs, the input of the natural language to a user frustration; map, by one or more programs, the user frustration to one or more solutions that make one or more changes of settings on the device; apply, by one or more programs, the one or more changes of settings, so as to set user preference settings on the device; and store, by one or more programs, the user preference settings in a common store for the user.

In yet another aspect, a computer system for identifying user preferences and changing settings of a device based on natural language processing is provided. The computer system comprises one or more processors, one or more computer readable tangible storage devices, and program instructions stored on at least one of the one or more computer readable tangible storage devices for execution by at least one of the one or more processors. The program instructions are executable to capture, by one or more programs running in background on the device, an input of natural language from a user of the device. The program instructions are executable to match, by the one or more programs, the input of the natural language to a user frustration. The program instructions are executable to map, by one or more programs, the user frustration to one or more solutions that make one or more changes of settings on the device. The program instructions are executable to apply, by one or more programs, the one or more changes of settings, so as to set user preference settings on the device. The program instructions are executable to store, by one or more programs, the user preference settings in a common store for the user.

DETAILED DESCRIPTION

Figure 1:
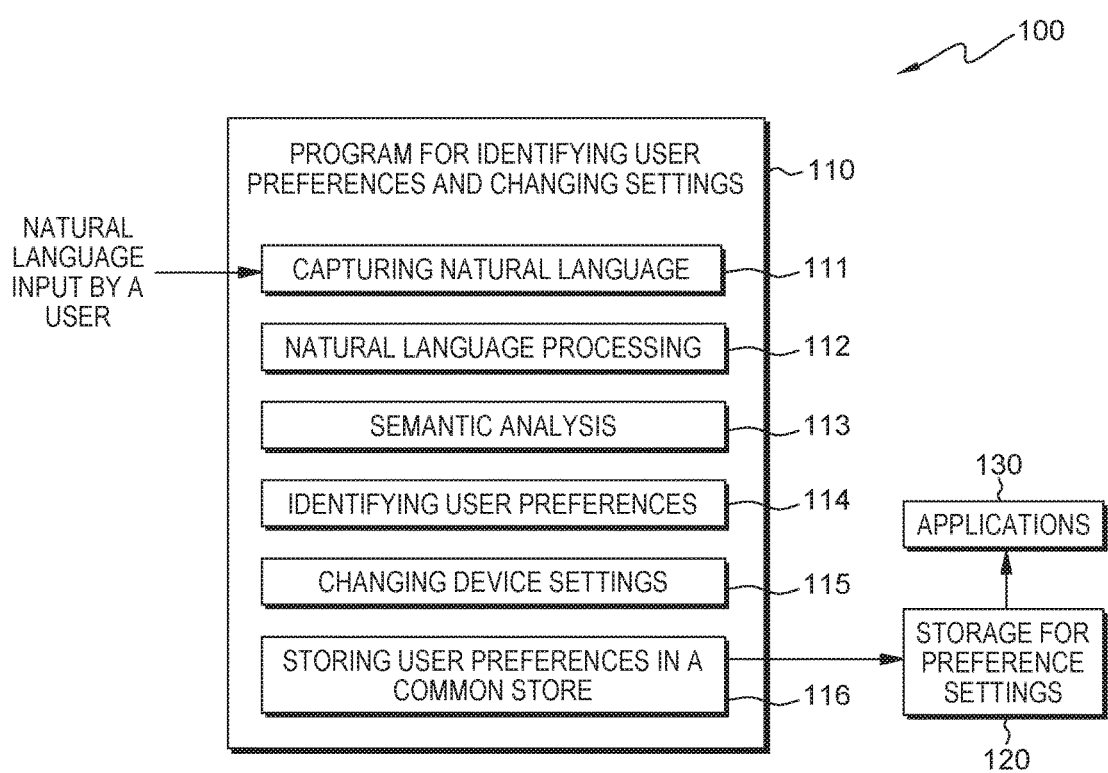
FIG. 1 is a diagram illustrating a system for identifying user preferences and changing settings of a device based on natural language processing, in accordance with one embodiment of the present invention.

Embodiments of the present invention provide a system for identifying user preferences and changing settings of a device (such as a mobile phone, tablet, and laptop) based on natural language processing. As a user is engaged in normal use of the device, the system applies user preferences to all applications on the device. Any natural language input (such as speech and texting) from a user of the device can be captured in real time by the system on the device. With existing technologies of natural language processing (NLP) and semantic analysis, the system extracts user's preferences.

The system uses the NLP and semantic analysis techniques to identify what the user's frustration is. The NLP and semantic analysis match the natural language input to a particular user frustration in a knowledge base of potential frustrations that are relevant to the device. This matching is standard with NLP implementations as the language based input is matched to an internal language agnostic representation. In embodiments of the present invention, an entry in the knowledge base describes a frustration of the user. Each of the frustrations is mapped to potential solutions that make changes of settings on the device (such as increasing the volume or turning Bluetooth on). The changes of settings on the device are then applied to the device and thus user preference settings are set on the device. The user preference settings are stored in a common store for the user; therefore, the user preference settings can be shared by applications on the device. The user preference settings are set at the device level; therefore, all applications on the device benefit from the changes of settings based on the NLP. For example, when user A has a phone conversation with user B and the voice is too low to be heard, user A says "I can't hear you"; the system parses the voice input and generates a user preference setting; as a result, the system for identifying user preferences and changing settings triggers the device system to turn the volume louder.

In embodiments of the present invention, the system for identifying user preferences and changing settings is running in background; therefore, the system is always listening to user frustrations they express through their normal use of the device. It is transparent to the user and does not require a conscious action. The user does not even need to know there is a solution to the problem, they only need to express the frustration. For example, the system captures users' frustrations expressed in their dialog when they are engaged in mobile phone conversations or chat programs.

The advantages of the system for identifying user preferences and changing settings of a device are as follows. (1) The system can capture and recognize the user natural language input that implies user preferences anytime and anywhere; therefore, the device does not need to be a setting mode or the device does not need any specific menu system to generate the recognized user commands. (2) The system runs in background and can continuously run natural language processing (NLP) and semantic analysis to exact useful information of user preferences. (3) The system provides convenient and fast way to let users customize their devices; therefore, the users only need to input natural language and the devices set appropriate settings. (4) The system can store the preference settings data and be available to all applications.

FIG. 1 is a diagram illustrating system 100 for identifying user preferences and changing settings of a device based on natural language processing, in accordance with one embodiment of the present invention. System 100 includes program 110 for identifying user preferences and changing settings. Program 110 runs in background on a device (such as a mobile phone, tablet, and laptop). Program 110 includes component 111 of capturing natural language that is input by a user of the device. Natural language input includes user's speech and texting on the device and the input can be captured in real time by component 111 of capturing natural language. Program 110 further includes component 112 of natural language processing (NLP). An existing technology of the NLP, such as frame based NLP, can be sufficient to recognize a number of textual patterns and trigger these patterns. Other more sophisticated NLP technologies may also be used. The NLP is used to match the natural language input to a particular user frustration within a knowledge base of potential frustrations. Program 110 further includes component 113 of semantic analysis. Natural language processing (NLP) and semantic analysis are continuously run to exact useful information of user preferences.

Program 110 further includes component 114 for identifying user preferences. The user preferences are identified based on the natural language processing (NLP) and semantic analysis. The user frustration is mapped to potential solutions that make changes of settings on the device. Program 110 further includes component 115 for changing device settings according to the user preferences. After identifying user preferences and finding the solutions to resolving the user frustration, component 115 for changing device settings applies the changes of settings on the device.

Program 110 further includes component 116 for storing user preferences in a common store. The user preferences are stored in storage 120 for preference settings. In an embodiment of the present invention, storage 120 resides on the device. In another embodiment, storage 120 may reside in cloud. The preference settings are set for the device and they can be shared by applications 130. Therefore, all applications on the device can benefit from the changes of settings. In yet another embodiment, the preference settings can be shared by other devices of the user.

Figure 2:
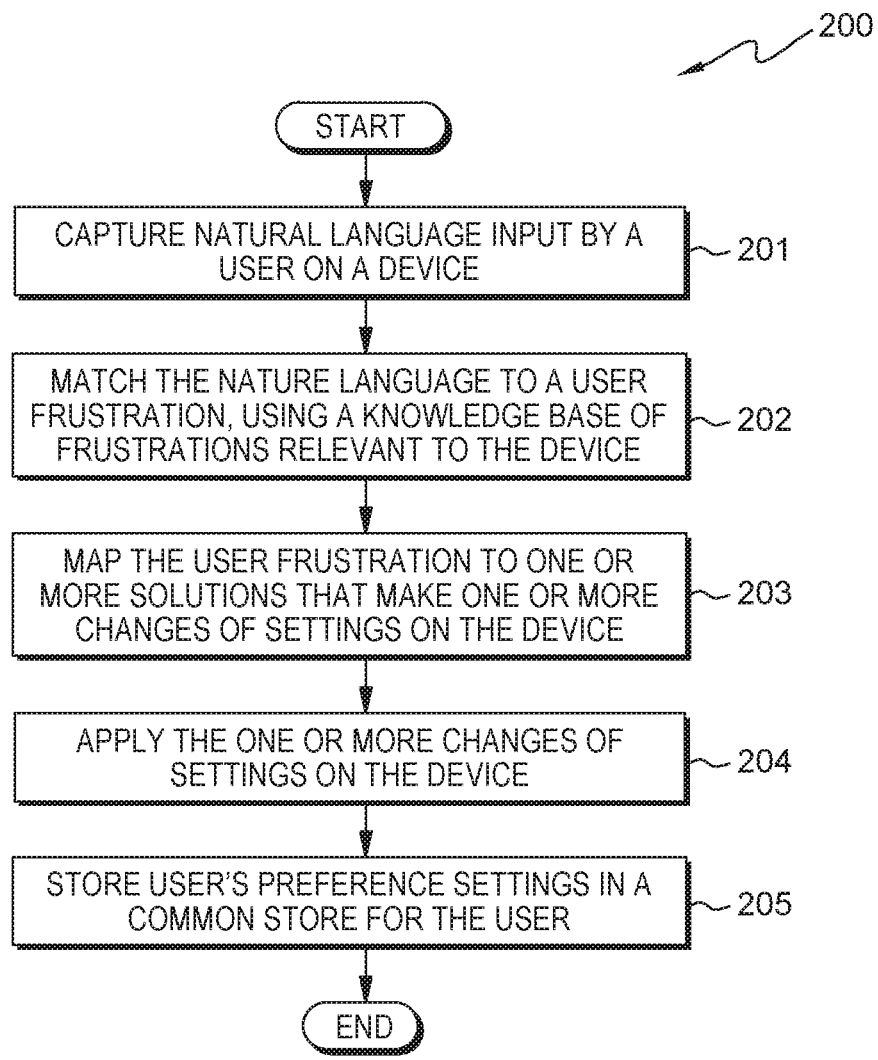
FIG. 2 is a flowchart showing operational steps for identifying user preferences and changing settings of a device based on natural language processing, in accordance with one embodiment of the present invention.

FIG. 2 is a flowchart showing operational steps 200 for identifying user preferences and changing settings of a device based on natural language processing, in accordance with one embodiment of the present invention. Operational steps 200 are implemented by program 110 (shown in FIG. 1) for identifying user preferences and changing settings. At step 201, program 110 captures natural language input by a user on a device. In the embodiments of the present invention, the device may be a mobile phone, tablet, and laptop. The natural language input, such as speech and texting, from the user can be captured in real time. Program 110 captures users' frustrations expressed in their dialog when they are engaged in mobile phone conversations or chat programs. For example, when a mobile phone user calls to another user and the voice is too small to be heard, the former says to the latter "I can't hear you"; program 110 captures the voice input in real time.

At step 202, program 110 matches the natural language (which is captured at step 201) to a user frustration, using a knowledge base of frustrations relevant to the device. Natural language processing (NLP) and semantic analysis are continuously run to identify what the user's frustration is. At step 203, program 110 maps the user frustration to one or more solutions that makes one or more changes of settings on the device. Therefore, user's preference settings are identified. After finding the solutions to resolving the user frustration, program 110 at step 204 applies the one or more changes of settings on the device. Thus, the user's preference settings are set on the device. At step 205, program 110 stores the user's preference settings in a common store for the user. The common store may reside either on the device or in a storage cloud. The user's preference settings are set for the device and they can be shared by any application on the devices. In addition, the user preference settings can be shared by other devices of the user.

Figure 3:
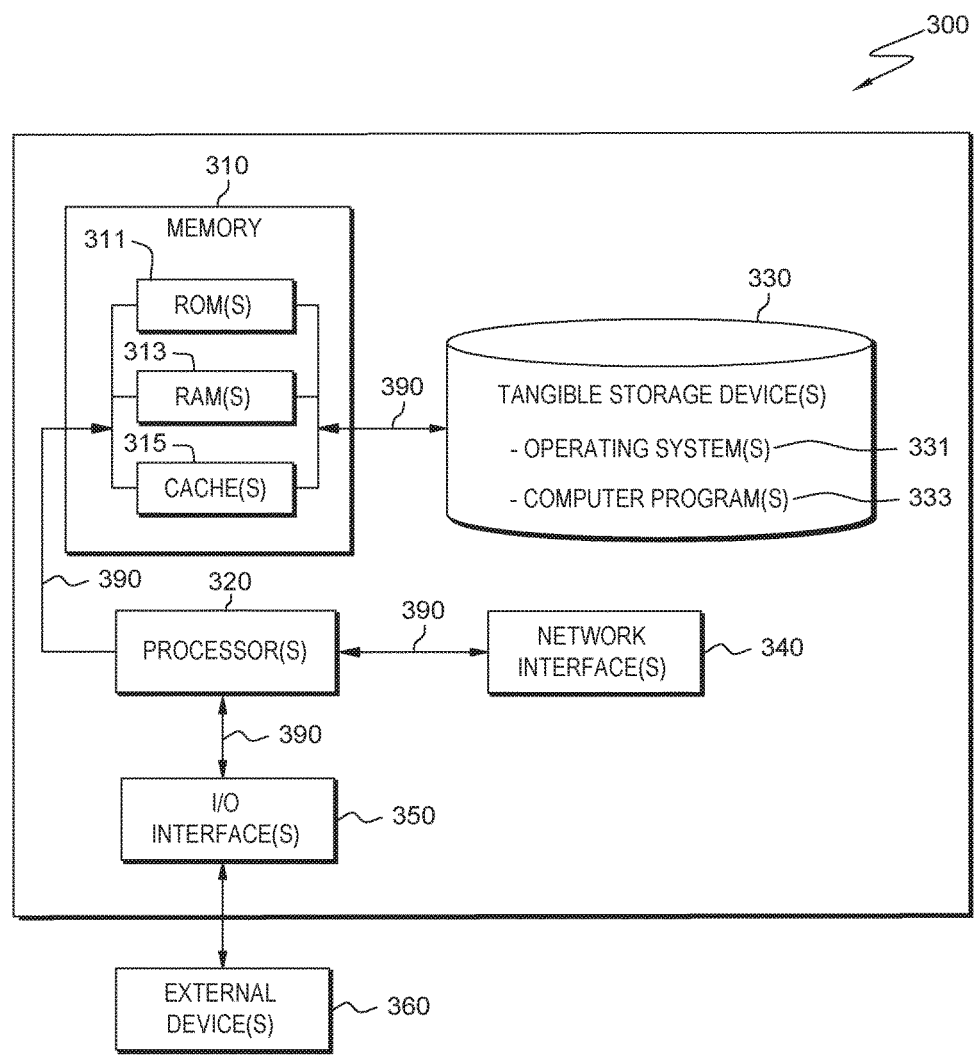
FIG. 3 is a diagram illustrating components of a device hosting one or more programs for identifying user preferences and changing settings of a device based on natural language processing, in accordance with one embodiment of the present invention.

FIG. 3 is a diagram illustrating components of device 300 hosting one or more programs for identifying user preferences and changing settings of a device based on natural language processing, in accordance with one embodiment of the present invention. It should be appreciated that FIG. 3 provides only an illustration of one implementation and does not imply any limitations with regard to the environment in which different embodiments may be implemented. The device may be any electronic device or computing system capable of receiving input from a user, executing computer program instructions, and communicating with another electronic device or computing system via a network. For example, the device may be a mobile phone, tablet, or laptop.

Referring to FIG. 3, device 300 includes processor(s) 320, memory 310, and tangible storage device(s) 330. In FIG. 3, communications among the above-mentioned components of device 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330. One or more computer programs 333 include one or more computer programs for identifying user preferences and changing settings of a device based on natural language processing. Device 300 further includes I/O interface(s) 350. I/O interface(s) 350 allows for input and output of data with external device(s) 360 that may be connected to device 300. Device 300 further includes network interface(s) 340 for communications between device 300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for identifying user preferences and changing settings of a device based on natural language processing, the method comprising:

capturing, by one or more programs running in background on the device, an input of natural language from a user of the device, wherein the one or more programs listen to a user frustration expressed in the natural language by the user while the user is using the device;

matching, by the one or more programs, the input of the natural language to the user frustration;

mapping, by one or more programs, the user frustration to one or more solutions to the user frustration, wherein the one or more solutions make one or more changes of settings on the device;

applying, by one or more programs, the one or more changes of settings on the device and setting user preference settings on the device, based on the one or more solutions; and storing, by one or more programs, the user preference settings in a common store for the user.

2. The method of claim 1, wherein the one or more programs comprise natural language processing and semantic analysis.

3. The method of claim 1, wherein the input of the natural language from the user of the device is a speech of the user.

4. The method of claim 1, wherein the input of the natural language from the user of the device is a text input of the user.

5. The method of claim 1, wherein the user preference settings in the common store are shared by applications on the device.

6. The method of claim 1, wherein a knowledge base of potential user frustrations is used by the one or more programs for matching the input of the natural language to the user frustration.

7. A computer program product for identifying user preferences and changing settings of a device based on natural language processing, the computer program product comprising a non-transitory computer readable storage medium having program code embodied therewith, the program code executable to:

capture, by one or more programs running in background on the device, an input of natural language from a user of the device, wherein the one or more programs listen to a user frustration expressed in the natural language by the user while the user is using the device;

match, by the one or more programs, the input of the natural language to the user frustration;

map, by one or more programs, the user frustration to one or more solutions to the user frustration, wherein the one or more solutions make one or more changes of settings on the device;

apply, by one or more programs, the one or more changes of settings on the device and set user preference settings on the device, based on the one or more solutions; and store, by one or more programs, the user preference settings in a common store for the user.

8. The computer program product of claim 7, wherein the one or more programs comprise natural language processing and semantic analysis.

9. The computer program product of claim 7, wherein the input of the natural language from the user of the device is a speech of the user.

10. The computer program product of claim 7, wherein the input of the natural language from the user of the device is a text input of the user.

11. The computer program product of claim 7, wherein the user preference settings in the common store are shared by applications on the device.

12. The computer program product of claim 7, wherein a knowledge base of potential user frustrations is used by the one or more programs for matching the input of the natural language to the user frustration.

13. A computer system for identifying user preferences and changing settings of a device based on natural language processing, the computer system comprising:

one or more processors, one or more computer readable tangible storage devices, and program instructions stored on at least one of the one or more computer readable tangible storage devices for execution by at least one of the one or more processors, the program instructions executable to:

capture, by one or more programs running in background on the device, an input of natural language from a user of the device, wherein the one or more programs listen to a user frustration expressed in the natural language by the user while the user is using the device;

match, by the one or more programs, the input of the natural language to the user frustration;

map, by one or more programs, the user frustration to one or more solutions to the user frustration, wherein the one or more solutions make one or more changes of settings on the device;

apply, by one or more programs, the one or more changes of settings on the device and set user preference settings on the device, based on the one or more solutions; and store, by one or more programs, the user preference settings in a common store for the user.

14. The computer system of claim 13, wherein the one or more programs comprise natural language processing and semantic analysis.

15. The computer system of claim 13, wherein the input of the natural language from the user of the device is a speech of the user.

16. The computer system of claim 13, wherein the input of the natural language from the user of the device is a text input of the user.

17. The computer system of claim 13, wherein the user preference settings in the common store are shared by applications on the device.

18. The computer system of claim 13, wherein a knowledge base of potential user frustrations is used by the one or more programs for matching the input of the natural language to the user frustration.

* * * * *